Figure 1:
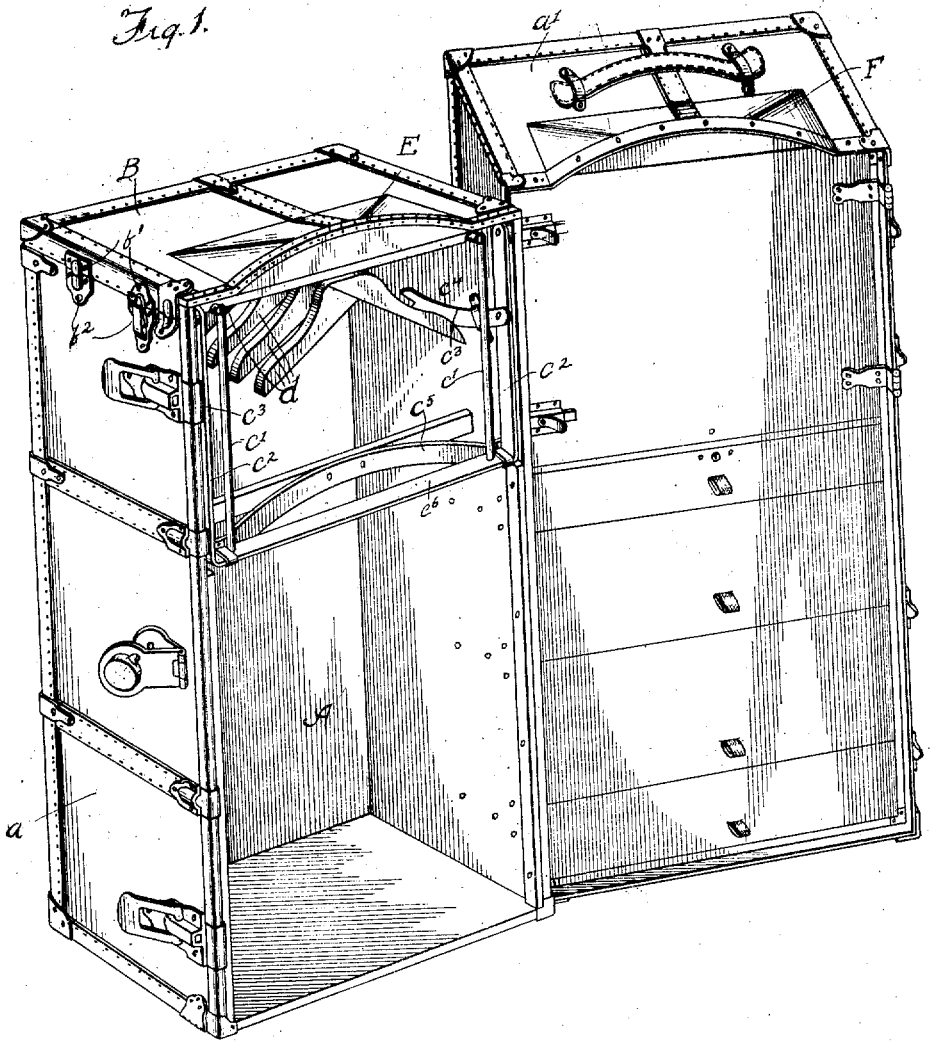

G. H. WHEARY.

WARDROBE TRUNK.

APPLICATION FILED DEC. 22, 1913.

Reissued Aug. 25, 1914.

13,792.

3 SHEETS—SHEET 1.

INVENTOR.

George H. Wheary.

WITNESSES

A. H. Kearney.

Katherine Holt

By Morsell & Caldwell

ATTORNEYS.

G. H. WHEARY.

WARDROBE TRUNK.

APPLICATION FILED DEC. 22, 1913.

Reissued Aug. 25, 1914.

13,792.

3 SHEETS—SHEET 2.

WITNESSES

C. H. Kenney

Katharine Holt

INVENTOR

George H. Wheary

By Morsell & Caldwell

ATTORNEYS.

G. H. WHEARY.

WARDROBE TRUNK.

APPLICATION FILED DEC. 22, 1913.

Reissued Aug. 25, 1914.

13,792.

3 SHEETS—SHEET 3.

WITNESSES

C. H. Keeney.

Katherine Holt

INVENTOR.

George H. Wheary,

By Morsell & Caldwell.

ATTORNEYS.

UNITED STATES PATENT OFFICE.

GEORGE HENRY WHEARY, OF RACINE, WISCONSIN, ASSIGNOR TO THE HARTMANN TRUNK COMPANY, OF RACINE, WISCONSIN, A CORPORATION OF WISCONSIN.

WARDROBE-TRUNK.

13,792. Specification of Reissued Letters Patent. Reissued Aug. 25, 1914.

Original No. 1,057,195, dated March 25, 1913, Serial No. 575,742. Application for reissue filed December 22, 1913. Serial No. 808,302.

*To all whom it may concern:*

Be it known that I, GEORGE H. WHEARY, a citizen of the United States, residing at Racine, in the county of Racine and State of Wisconsin, have invented a new and useful Wardrobe-Trunk, of which the following is a specification.

My invention relates to wardrobe-trunks of that character in which provision is made for clothes-hangers, thus permitting coats, skirts and trousers, each on a separate hanger, to be carried therein, and adapting the trunk, when turned up on end, to serve as a closet, whereby the clothes are not only more readily packed and unpacked, and preserved in good condition during the time the trunk is closed, but also made more accessible when the trunk is open.

Objects of my invention are to provide an improved arrangement of the hangers in the trunk; to provide an arrangement whereby the hangers will be more accessible and more easily removed and replaced than heretofore; to provide means for more effectively holding the hangers in place and for securely clamping clothes in place and against disarrangement while the trunk is closed and being moved about; to provide an improved wardrobe trunk of less length than heretofore, whereby the same will be easier to handle and transport; to provide an improved construction and arrangement whereby, when the trunk is standing on end, or when the tray containing the hangers is tilted to an upright position, depending upon the style of the trunk, there will be no lost space above the hangers, thus reducing the size of the trunk to a minimum; to provide an improved arrangement whereby any hanger can be removed upwardly, without disturbing the others, thus making it possible to remove the clothing at the back without disturbing the clothing in front, when the trunk is open and in position to properly support the hangers; to provide an improved construction and arrangement whereby hooks will not be necessary for the hangers, thus shortening the distance between the tops of the hangers and the end wall of the trunk, or the end wall of the tray depending upon the style of trunk in which my invention is employed; and to provide certain details and features of improvement and combinations tending to increase the general efficiency of a trunk of this particular character.

To the foregoing and other useful ends, my invention consists in matters hereinafter set forth and claimed.

Figure 2:
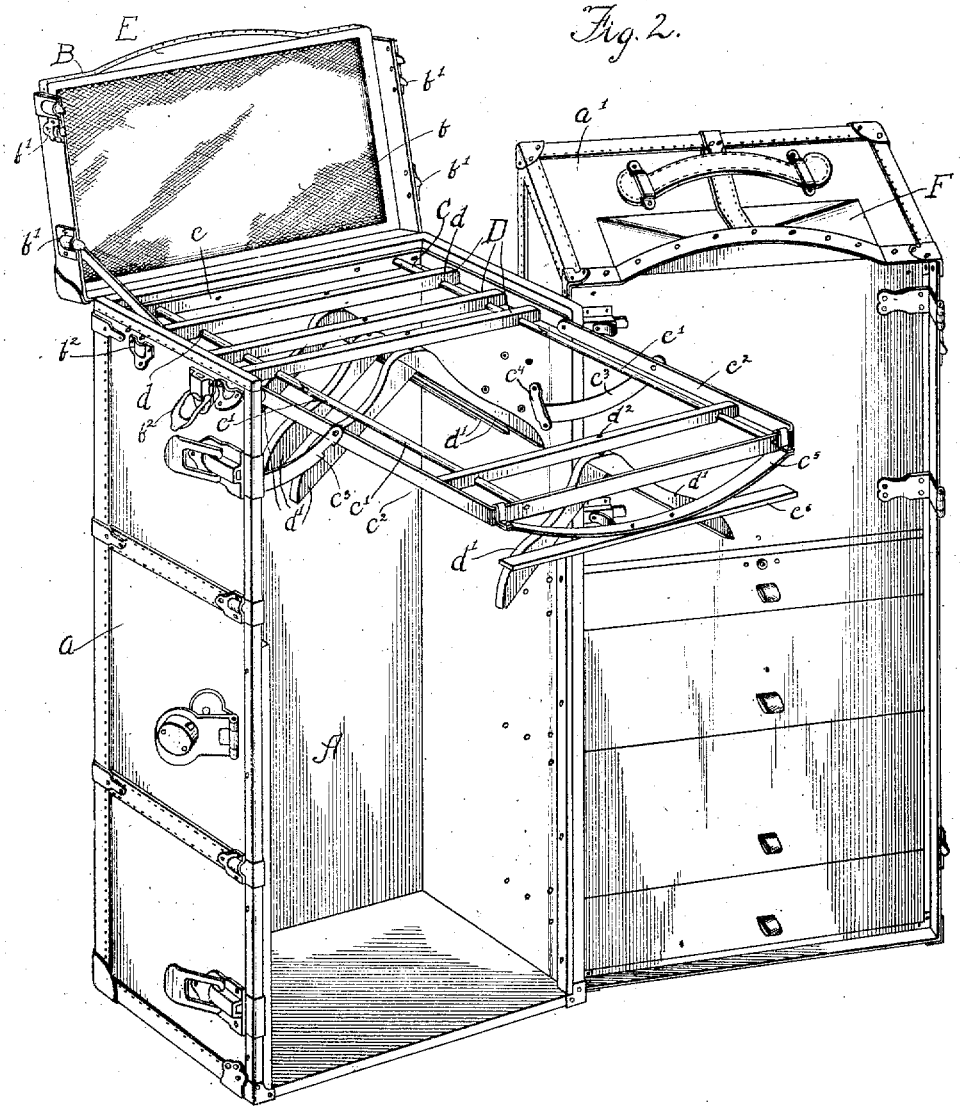
Figure 3:
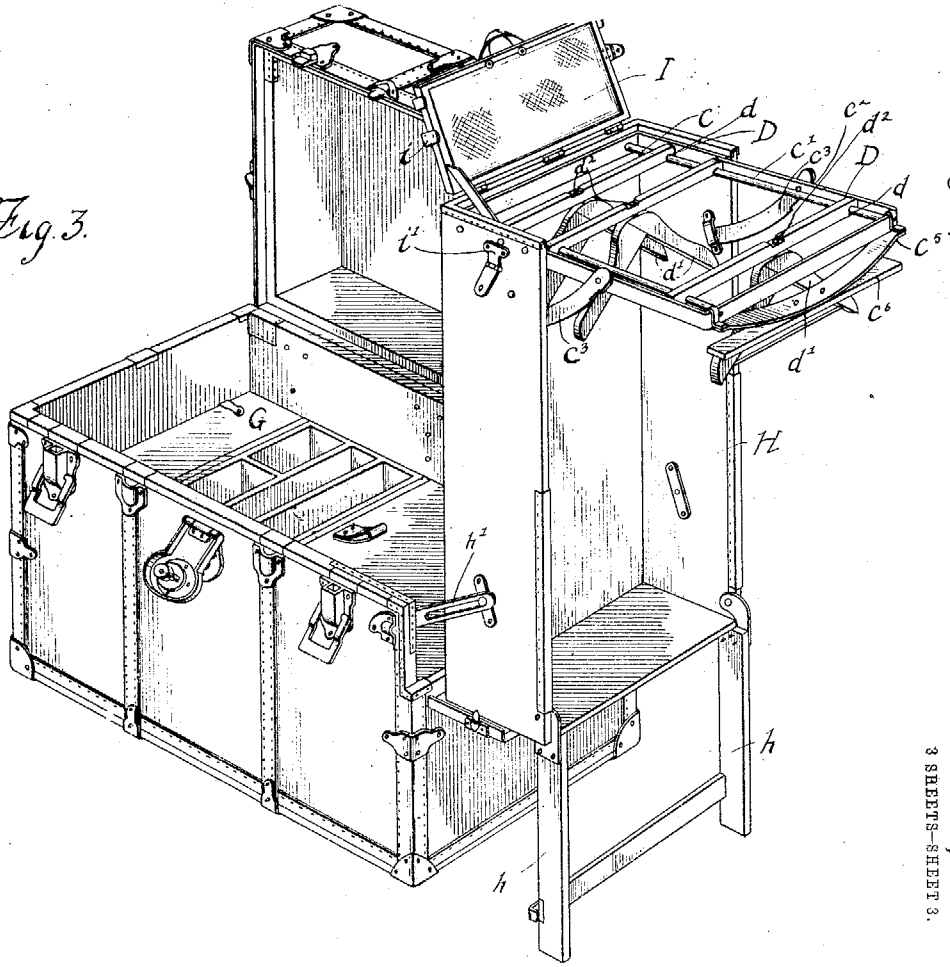
Figure 4:
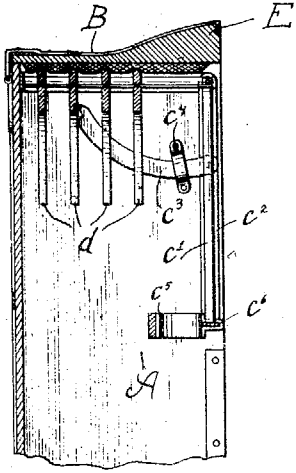

In the accompanying drawings—Figure 1 is a perspective of a trunk embodying the principles of my invention, showing the same open and ready to be closed. Fig. 2 is a view similar to Fig. 1, but showing the hanger rack extended from the trunk, and the upper end of the trunk open, whereby the hangers may be widely separated while the trunk is standing open, thus facilitating packing and unpacking of the trunk, and making it easy for the user to arrange the clothes, notwithstanding the small area into which they are compressed during the time the trunk is closed. Fig. 3 is a view similar to Fig. 2 showing my invention applied to a trunk in which the hangers are carried by a till that is movable to an upright position, whereby the trunk does not need to stand on end, as is the case in Figs. 1 and 2, but may remain on the floor in a horizontal position; and Fig. 4 is a vertical sectional view of the upper portion of the trunk.

As thus illustrated, and referring to Figs. 1 and 2, the trunk A may be of any suitable known or approved form or construction. As shown, it comprises a bottom section *a* and a top section *a'*, which are hinged together, the latter section serving as a lid or cover for the trunk. When the trunk is open it stands on one end thereof, so that the end lid or cover B is uppermost. This end lid or cover B has an inner pad or lining *b*, the purpose of which will hereinafter more fully appear. It will be seen that the said lid or cover B is hinged at its lower edge to the bottom of the trunk, so that it can be thrown back in the manner shown in Fig. 2, when the trunk is standing open. The said trunk is of the type ordinarily known as a wardrobe trunk, and as such is provided with a rack for supporting clothes-hangers. The said rack consists of a pair of round bars C which have their inner ends secured to a strap *c* on the bottom wall of the trunk, which strap is arranged near the hinged edge of the cover B, as shown in Fig. 2. The outer ends of these bars C are pivotally connected with the rods $c'$, which latter are adapted to swing up and down—that is to say, they are adapted to swing back into the trunk, as shown in Fig. 1. The strap $c$ is U-shaped in character, and its outer ends are connected with a similar U-shaped strap or frame of metal $c^2$, the transverse portion of the latter being secured to the outer ends of the rods $c'$, whereby a hinged or jointed frame is provided. The swinging frame, composed of the rods $c'$ and the U-shaped strap or frame $c^2$, is held in a horizontal position by the braces $c^3$ which have their upper ends pivoted to the frame $c^2$, and which have their inner free ends adapted to slide through brackets $c^4$ which are secured to the side walls of the trunk near the outer edges thereof. These braces $c^3$ have notches therein which engage the brackets $c^4$ to hold the swinging frame in horizontal position, as shown in Fig. 2, and have other notches which engage the said brackets to lock the frame in its closed position, as shown in Fig. 1. This will be readily understood from the drawings. The rods C and the swinging extensions $c'$ thereof constitute rails upon which to movably or adjustably support the clothes hangers. The said clothes hangers are each provided with a horizontal bar D having notches $d$ on the underside thereof, near the outer ends of the same, adapted to engage the rods C or $c'$, as shown in Fig. 2. These bars D have the remaining portions $d'$ of the hangers secured thereto by pivots $d^2$, the hangers shown being what are ordinarily known as coat hangers. It will be understood, however, that the hangers can be of any suitable character, so far as the article of clothing is concerned, and can be provided with any suitable means for supporting skirts or trousers or other articles of clothing.

The outer end of the swinging frame, composed of the rods $c'$ and bent or U-shaped straps $c^2$, is provided with a bow spring $c^5$, to which is secured a plate or presser bar $c^6$, which latter is adapted to yieldingly press the clothes down into position when the trunk is closed, as shown in Fig. 1.

It will be seen that the hangers are adapted to slide along the rods C and $c'$, so that they can be widely separated while the trunk is open and the hanger rack extended, as shown in Fig. 2, thus facilitating the hanging in place of the clothes or the removal thereof. After the clothes are all hung in place, then the hangers are all crowded together and shoved inward, so that they will all be supported within the trunk by the rods C; the swinging outer end of the hanger frame is then pressed downward, as shown in Fig. 1, thus bringing the presser bar $c^6$ into position to hold the clothes firmly together. Then the cover or lid B is closed, so that its pad or yielding lining $b$ will engage the bars D, or the clothing laid over the same, thus holding the latter firmly in place on the rods C, so as to prevent the hangers from rattling around while the trunk is being moved about, and thus prevent disarrangement of the clothing. It is at this time, that the braces $c^3$ are locked to the brackets $c^4$, thus preventing the swinging outer end of the hanger frame from moving outward, that is to say, it is locked in position as shown in Fig. 1. Thus the entire structure comprising the hangers and hanger frame is held in rigid condition, so that the clothes are firmly held in position, and the structure can not rattle or move around in the trunk while it is closed and being handled and moved from place to place.

As there is a bulge E on the outside of the cover or lid B, and a similar bulge F on the corresponding end of the trunk section $a'$, it follows that the trunk can only stand on one end, and can never be turned upside down—that is to say, its upper end is, by these bulging portions, made convex to the extent that it will not stand readily on this end and will always be raised to stand on the other end. Thus the danger of the trunk being turned upside down, so that the clothing might tend to become wrinkled or disarranged, is precluded or at least greatly reduced. A trunk of this kind can, of course, be used as a sort of temporary or portable closet—that is to say, in traveling it can be opened and allowed to stand upright, as shown in Fig. 2, and in this way the clothes hangers can be easily taken down and readily hung up, and the clothing is about as accessible as it would be in an ordinary closet.

As shown in Fig. 3, the trunk is of that kind in which one or more horizontal trays are employed, one on top of the other, such for example as the bottom tray G and the upper tray H, making it desirable that the trunk shall always stand horizontally while being packed or unpacked, in the well known and familiar manner. Such being the case, it becomes desirable to make the upper tray H suitable for carrying the hangers and hanger frame, which are precisely the same as those previously shown and described, and to provide the said tray with the swinging end wall I, which latter is of the same padded character as the swinging end wall B, previously described. It is also desirable, therefore, that the said tray H be adapted to swing in an upright position, so that the said hangers will be at the upper end thereof, while the clothes are being hung up or taken down, as shown in Fig. 3. The swinging tray H is, as a matter of further and special improvement, provided with swinging legs $h$ which are adapted to fold into the tray when the trunk is closed, and which are adapted to rest on the floor when the trunk is open and the tray in an upright position, as shown in the drawings. Thus the hangers, which have bars D similar to those previously shown and described, are adapted to rest upon the hanger frame at the upper end of the tray H, when the latter is in an upright position, and the effect is substantially the same as that shown in Figs. 1 and 2, and when the tray cover I is closed the garment hangers and the clothes folded thereon will be held in the same manner as heretofore explained. Obviously, therefore, my improved arrangement for supporting the clothes hangers can be applied to trunks of various kinds and descriptions, and in which the arrangement facilitates packing and unpacking of the trunk, as during such operation the hangers are very widely separated, thus giving ready access to the clothes, and notwithstanding the fact that when the trunks are closed the hangers are crowded together in a very small area, as is also the case with the clothing. This is obviously advantageous, as it not only makes it much easier and more convenient to use the trunk as a closet, but also renders it less difficult to pack and unpack the trunk without mussing or wrinkling the clothes. In the said Fig. 3, it will be seen that the tray H is provided with slotted links $h'$, at the sides thereof, which connect with the main body of the trunk, whereby it is firmly held in upright position. The slots in these links permit the tray, in a manner which will be readily understood, to readily swing down and into the trunk.

The end lid or cover B is preferably provided with catches or fastening devices $b'$ which engage coöperating devices $b^2$ on the sides of the trunk of any suitable, known or approved form to lock the trunk closed. The swinging end wall or member I is similarly provided with devices $i$ adapted to engage devices $i'$ on the sides of the tray to lock the said members closed.

It will be readily understood that the trunk can be provided with a suitable lock and other devices for keeping it together while closed.

From the foregoing it will be obvious that no hooks are required for the hangers, and that, consequently, there is no lost space between the tops of the hangers and the end wall of the trunk, or the end wall of the tray, depending upon the style of trunk in which my invention is employed. By thus reducing the space between the tops of the hangers and the end wall of the trunk, or the end wall of the tray, as the case may be, the total length of the trunk is materially reduced, thus facilitating handling and transportation thereof, and completely satisfying the requirements of the railroads in this respect.

Prior to my invention, it was found impossible to properly support certain kinds of clothing in a wardrobe trunk of say fifty or fifty-four inches in length, and trunks of such length were found to be unsatisfactory and objectionable by the railroads. With my invention, however, a one-piece dress, the so-called princess style, can be satisfactorily supported on a hanger, and also long skirts, in a trunk which does not need to exceed forty inches in length—that is to say, forty inches in length when the trunk is standing on end, or when the tray is tilted to an upright position, as the case may be. If a dress or skirt or other garment is longer than the trunk, the lower end thereof can be brought up and closed over the bar D of the hanger. Any clothing thus arranged is held in place by the pad $b$ of the door B when the latter is closed. A trunk of such size is, I find, entirely satisfactory to the railroads, and is also entirely satisfactory to the user, as it is as fully satisfactory for the purpose for which it is intended. In fact, and by the provision of the swinging or movable end wall of the trunk, or for the end of the tray, it is apparent that the clothing at the back can be removed without disturbing the clothing in the front, as any hanger can be moved upwardly without disturbing the other hangers. Previous to my invention this was impossible, as the clothing at the bottom of the trunk, or the back when the trunk was standing on end, could only be removed by first removing or disturbing the clothing on top or in front, which was extremely objectionable. Also, and by using the swinging end wall of the trunk, or the swinging end wall of the tray, as a means for clamping the hangers in place, the clothing is held properly in place, and no inside following board or rack is required, so that further space is saved with a view to reducing the size of the trunk. It follows, therefore, that I do not limit myself to the exact construction shown and described.

The padding $b$ makes contact, it will be seen, for substantially the full length of the bar $c$, or with the clothes thereon, whereby the latter are prevented from slipping off. The said padding or cushion $b$ is sufficiently soft to be indented by the bars, or by the clothes, thus making parallel furrows in the padding. For this purpose the lid B has a rigid wall that is faced with the said padding, and which is strong enough to withstand the compression. At the same time, however, the said padding or cushion $b$ is sufficiently firm to properly and securely hold the clothes on the bar $c$, but without injury thereto. By thus gripping the clothes at one end of the trunk, and by using a lid for this purpose which does not materially lengthen the trunk, I am enabled to provide a much shorter trunk than heretofore.

It will be seen that my invention provides a wardrobe trunk which is divided longitudinally to form two trunk sections adapted to stand on end and hinged together along their longitudinal edges, the two sections being capable of being opened outwardly away from each other when stood on end, and the top wall of one of said sections being hinged at its rear edge to adapt it to swing upwardly and backwardly when the trunk is open, and the end of the other section being rigid. The open ended section is provided interiorly with rails to act as supports for clothes hanger elements. It will be observed that this construction and arrangement is such as not only to provide for access to any one of the clothes hangers without withdrawing the entire series bodily from the wardrobe section, but I accomplish this in such way that when the trunk is opened out, and the hinged top or cover raised, the entire structure will have the minimum height, that is to say, a height equal only to the length of the trunk sections together with one-half the width of the end wall of the trunk, or in other words the additional height only of the hinged top or cover. It is obvious that the operation of opening and closing this trunk is easily and readily accomplished, by reason of the fact that it is only necessary to raise or lower a half section of the trunk top or cover, which operation is much less difficult than if an entire end wall had to be lifted. It will be further noted that the trunk section in which the end wall is rigid is provided with a projecting flange or rim, which, when the two trunk sections are brought together to a closed position, is adapted to overlap the edges of the open ended section, and to also overlap the free edge of the hinged top or cover. By this provision the trunk is made to possess the maximum strength and rigidity, and therefore can withstand the usual strains and rough handling to which trunks are subjected. Also the portion of the flange which overlaps the free edge of the hinged top or cover serves to assist in locking said hinged top or cover in place.

What I claim as my invention is:

1. In a trunk, one or more clothes hangers, each having a bar upon which the clothes are supported, by draping the clothes over the upper edge of the bar, and a movable end wall for said trunk, having a rigid wall faced inside with padding which engages the clothes to clamp the same upon the said upper edge of the bar, said padding adapted to make contact with the said bar, or with the clothes thereon, for substantially the full length thereof, whereby the clothes are securely held on the bar without injury thereto.

2. In a trunk, one or more clothes hangers, each having a bar upon which the clothes are supported, by draping the clothes over the upper edge of the bar, a movable end wall for said trunk, having a rigid wall faced inside with padding which engages the clothes to clamp the same upon the said upper edge of the bar, said padding adapted to make contact with the said bar, or with the clothes thereon, for substantially the full length thereof, whereby the clothes are securely held on the bar without injury thereto, and means for locking said end wall in closed position.

3. In a trunk having a movable end wall and provided with garment hanger rails and one or more garment hangers adjustably mounted thereon, the said garment hangers being formed in part of bars which extend in lines parallel with the movable end wall of the trunk, and a yielding pad interposed between the movable end wall and the rails of the hangers and which is adapted to be pressed embeddingly into engagement with the rail portions of the hangers and clothes draped thereon to hold the same in adjusted position when the end wall is moved to closed position.

4. In a trunk having a movable end wall and provided with garment hanger supporting means and one or more garment hangers adjustably mounted thereon, a yielding pad interposed between and engaging the movable end wall and the garment hangers for holding the garment hangers and clothes draped thereon in adjusted position, and means for holding the movable end wall in pad engaging position and in a position to cause the draped clothes and portions of the hangers to embed into the pad.

5. A wardrobe trunk, comprising a trunk body divided vertically into two sections which are hinged together, one of said sections having an upper open end, a cover hinged to the trunk body for closing said upper end, garment hanger rails mounted in the upper portion of the open ended section, garment hangers slidably mounted on said rails, and a pad interposed between the cover and the garment hangers and into which the garment hangers are adapted to embed when the cover is in closed position.

6. A wardrobe trunk, comprising a trunk body divided vertically into two sections which are hinged together, one of said sections having an upper open end, a cover hinged to the trunk body for closing said open end, garment hanger rails mounted within the upper portion of the open end section on the opposite side walls of said section, garment hangers extending transversely across the open ended section and slidably mounted on said rails, and a pad interposed between the cover and the rails and engaging the portions of the hangers between the rails, the said pad being of greater thickness than the distance between the cover and the upper edge portions of the garment hangers to cause the said hangers to embed into the pad when the cover is closed.

7. A wardrobe trunk, garment hanger rails mounted within the upper portion of the wardrobe and at a distance below the top of the wardrobe, garment hangers extending transversely across said wardrobe, and slidably mounted on said rails, and a yielding pad interposed in the space between the top of the wardrobe and the rails, and engaging the portions of the hangers between the rails, said pad being of greater thickness than the distance between the top of the wardrobe and the upper edge portions of the garment hangers, to cause said hangers or clothes draped thereon to embed into the pad when the cover is closed.

8. A wardrobe trunk, rails mounted in the upper end of the wardrobe a desired distance below the top or cover of said wardrobe, hangers comprising lower coat-suspending arms and an upper horizontal arm, the latter movably mounted on the rails and adapted to have clothing draped thereover, and a pad interposed between the top edges of the horizontal arms of the hangers and the underside of the top or cover of the wardrobe section, and into which pad the said horizontal arms of the hangers or the clothes suspended thereover are adapted to embed.

9. A wardrobe trunk divided longitudinally to form two trunk sections adapted to stand on end and hinged together along their longitudinal edges, to adapt the trunk sections to be opened outwardly away from each other when the trunk is standing on end, and the top of one of said sections being hinged at its rear edge to adapt it to swing upwardly and backwardly when the trunk is open, the section carrying this hinged lid being provided interiorly with clothes hanger elements, and an interposed pad between the clothes hanger elements and the underside of the hinged top wall, and into which pad the clothes hanger elements or clothing suspended thereover are adapted to embed.

In testimony that I claim the foregoing as my own, I have hereto affixed my signature in the presence of two witnesses.

GEORGE HENRY WHEARY.

Witnesses:
AL. A. RITTER,
ANNA M. NELSON.